(12) United States Patent
Chien et al.

(10) Patent No.: US 11,387,962 B2
(45) Date of Patent: Jul. 12, 2022

(54) BASE STATION AND USER EQUIPMENT FOR MOBILE COMMUNICATION SYSTEM

(71) Applicant: Institute For Information Industry, Taipei (TW)

(72) Inventors: Chun-Che Chien, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 80 days.

(21) Appl. No.: 16/371,033

(22) Filed: Mar. 31, 2019

(65) Prior Publication Data

US 2019/0305909 A1 Oct. 3, 2019

Related U.S. Application Data

(60) Provisional application No. 62/651,252, filed on Apr. 1, 2018.

(51) Int. Cl.
*H04W 4/00* (2018.01)
*H04L 5/00* (2006.01)
(Continued)

(52) U.S. Cl.
CPC .......... *H04L 5/0053* (2013.01); *H04L 1/1812* (2013.01); *H04W 72/0446* (2013.01)

(58) Field of Classification Search
CPC ... H04L 1/1812; H04L 1/1861; H04L 1/1893; H04L 5/0053; H04L 5/0055; H04W 72/042; H04W 72/0446
(Continued)

(56) References Cited

U.S. PATENT DOCUMENTS

2014/0098780 A1  4/2014 Kim et al.
2015/0071193 A1* 3/2015 Seo ................ H04L 1/1692
                                                  370/329
(Continued)

FOREIGN PATENT DOCUMENTS

CN    101568153 A   10/2009
CN    103179670 A   6/2013
(Continued)

OTHER PUBLICATIONS

Office Action to the corresponding Chinese Patent Application rendered on Jun. 25, 2021, 17 pages (including English translation).

*Primary Examiner* — Thai D Hoang
(74) *Attorney, Agent, or Firm* — Skaar Ulbrich Macari, P.A.

(57) ABSTRACT

A base station (BS) and a user equipment (UE) for a mobile communication system are provided. The BS transmits a downlink reception indication message, including a serving source configuration and a downlink parameter setting for signal combination, to the UE. The serving source configuration indicates a plurality of serving sources. The BS generates a first downlink signal and a second downlink signal based on a piece of downlink information. The first downlink signal carries a first part of the piece of downlink information and the second downlink signal carries a second part of the piece of downlink information. The BS further transmits the first downlink signal to the UE through the first serving source and transmits the second downlink signal to the UE through the second serving source.

9 Claims, 13 Drawing Sheets

(51) Int. Cl.
*H04W 72/04* (2009.01)
*H04L 1/18* (2006.01)

(58) Field of Classification Search
USPC .................................. 370/329–330, 335–345
See application file for complete search history.

(56) References Cited

U.S. PATENT DOCUMENTS

2017/0332370 A1    11/2017  Rico Alvarino et al.
2019/0045533 A1*    2/2019  Chatterjee ......... H04W 72/0446
2019/0297603 A1*    9/2019  Guo ..................... H04L 5/0051

FOREIGN PATENT DOCUMENTS

CN    106576302 A    4/2017
CN    107113136 A    8/2017
CN    107809770 A    3/2018
CN    107810648 A    3/2018

* cited by examiner

BASE STATION AND USER EQUIPMENT FOR MOBILE COMMUNICATION SYSTEM

PRIORITY

This application claims priority to U.S. Provisional Patent Application No. 62/651,252 filed on Apr. 1, 2018, which is hereby incorporated by reference in its entirety.

FIELD

The present invention relates to a base station (BS) and a user equipment (UE) for a mobile communication system. More particularly, the BS provides multiple serving sources for uplink and downlink multiplexing transmission. In addition, the UE can select at least one of the serving sources to transmit uplink signals to the BS to increase transmission reliability and reduce transmission latency.

BACKGROUND

With the rapid development of wireless communication technologies, wireless communication has found wide application in people's life, and people's demand for wireless communication is increasing. The next generation of mobile communication system (which is generally referred to as the 5G mobile communication system currently) has proposed new service types, e.g., Ultra-reliable and Low Latency Communication (URLLC), Enhanced Mobile Broadband (eMBB) communication, and Massive Machine Type Communication (mMTC).

The conventional transmission mechanisms use the different cells (e.g., different base stations or different transmission reception points (TRPs) of a single base station) to perform the downlink data transmissions mainly for aiming at increasing throughput or avoiding signal interference. However, these downlink data transmissions for increasing transmission rate are mainly achieved by different cells to transmit the data signals carrying different transport blocks (TB s) respectively. On the other hand, in order to increase reliability of data transmission, the conventional transmission mechanisms may use different TRPs to transmit the same data signal waveform to improve the power gain at the receiving end; however, this way could not give an additional coding gain bring from channel coding through the multiple TRPs. In other words, all the conventional transmission mechanisms could not provide ultra-reliable transmission with a diversity gain for the receiving end (i.e., the UE) to receive a TB within a bounded latency, so they could not meet the requirements for the URLLC service.

Besides, in the conventional transmission mechanisms, since the uplink and downlink control signals are all transmitted from/to a single cell to/from a UE, the reliability of control signal transmission could not be increased. Accordingly, an urgent need exists in the art to provide a transmission mechanism to provide the UE with ultra-reliable and low latency communication to meet the requirements for the URLLC service.

SUMMARY

An objective of certain embodiments is to provide a transmission mechanism, which enables a base station (BS) to provide multiple serving sources to perform uplink and downlink multiplexing transmission of a TB through the serving sources so that the UE could achieve reliable TB transmission/reception within a bounded latency to meet the requirements for the URLLC service or other services with low latency. Moreover, in the transmission mechanism, the UE can select at least one of the serving sources to transmit uplink signals to the BS to increase uplink transmission reliability and reduce uplink transmission latency.

Provided is a base station (BS) for a mobile communication system. The BS comprises a transceiver and a processor. The processor is electrically connected to the transceiver, and is configured to execute the following operations: generating a downlink reception indication message including a serving source configuration and a downlink parameter setting for signal combination, the serving source configuration indicating a plurality of serving sources; transmitting the downlink reception indication message to a user equipment (UE) via the transceiver; generating a first downlink signal and a second downlink signal based on a piece of downlink information, wherein the first downlink signal carries a first part of the piece of downlink information and the second downlink signal carries a second part of the piece of downlink information; transmitting the first downlink signal to the UE through a first serving source of the serving sources via the transceiver; and transmitting the second downlink signal to the UE through a second serving source of the serving sources via the transceiver.

Also provided is a base station (BS) for a mobile communication system. The BS comprises a transceiver and a processor. The processor is electrically connected to the transceiver, and is configured to execute the following operations: generating an uplink transmission indication message including a serving source configuration and an uplink transmission parameter setting, the serving source configuration indicating a plurality of serving sources; transmitting the uplink transmission indication message to a user equipment (UE) via the transceiver; and receiving a first uplink signal from the UE through a first serving source of the serving sources via the transceiver.

Further provided is a user equipment (UE) for a mobile communication system. The UE comprises a transceiver and a processor. The processor is electrically connected to the transceiver, and is configured to execute the following operations: receiving an uplink transmission indication message from a base station (BS), the uplink transmission indication message including a serving source configuration and an uplink transmission parameter setting, the serving source configuration indicating a plurality of serving sources; selecting a first serving source from the serving sources; and transmitting a first uplink signal to the base station through the first serving source via the transceiver.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. These example embodiments are not intended to limit the present invention to any particular environment, applications, examples, embodiments, or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
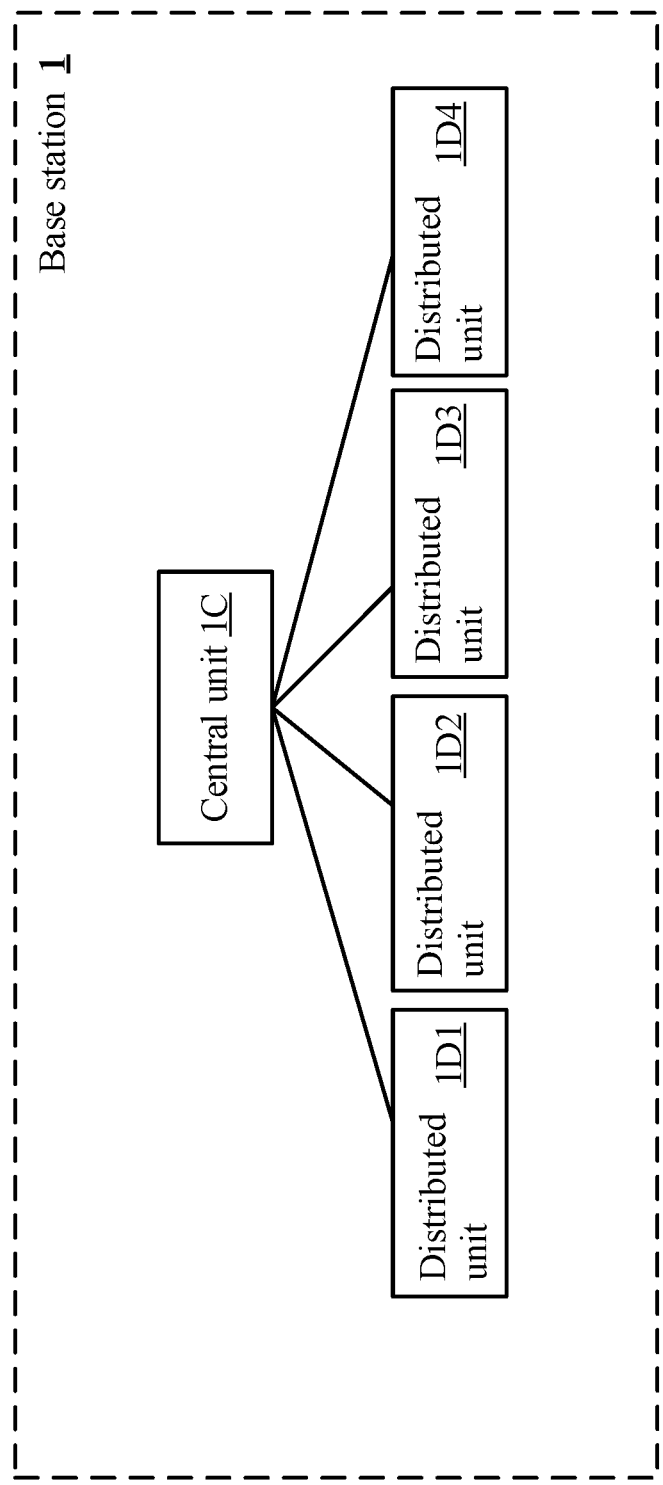
FIG. 1 depicts an implementation structure of the BS 1 according to the present invention.
Figure 2:
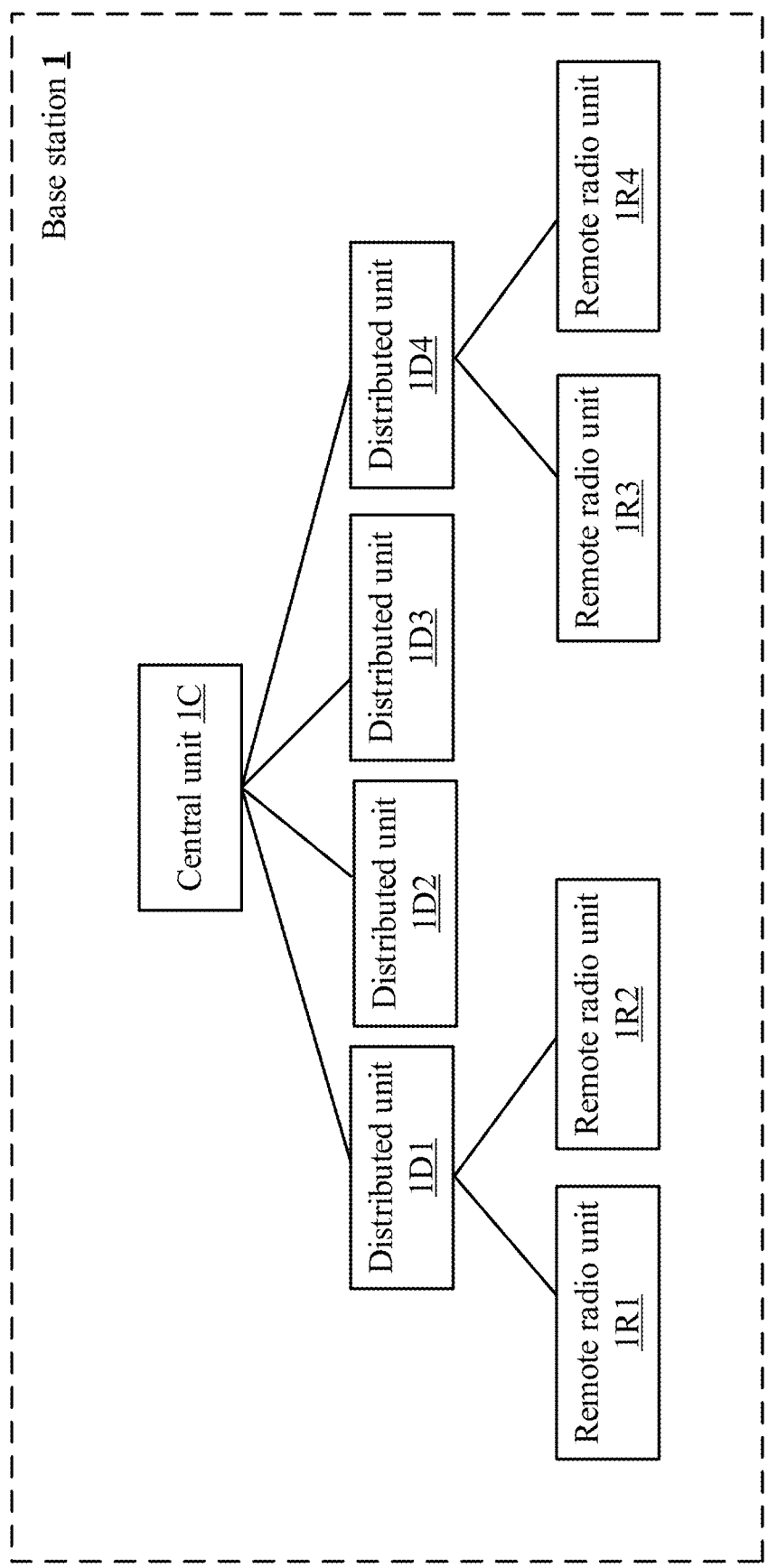
FIG. 2 depicts another implementation structure of the BS 1 according to the present invention.

A first embodiment of the present invention is as shown in FIGS. 1 and 2, which depict two different implementation structures of the BS 1 according to the present invention. The BS 1 is adapted for a wireless communication which may be the next generation of mobile communication system (broadly called 5G mobile communication system currently) or any mobile communication systems based on the orthogonal frequency division multiple access (OFDMA) technology. The description below is based on the 5G mobile communication system to illustrate the present invention; however, how to extend the technical means of the present invention to be applied to other OFDMA-based mobile communication systems shall be appreciated by those of ordinary skill in the art, and thus will be not further described herein.

The BS 1 in the 5G mobile communication system is usually called a "gNB." In the implementation structure illustrated in FIG. 1, the BS 1 is split to two types of key devices—that is, the BS 1 may include one central unit (CU), e.g., the central unit 1C, and one or more distributed units (DUs) connected to the CU, e.g., the DUs 1D1, 1D2, 1D3, 1D4. In this implementation structure, each of DUs further includes a radio unit (RU), i.e., the radio frequency (RF) functionality has been integrated into the DU. The connections between the CU and the DUs may be fiber connections (but not limited thereto). To simplify the description, only four DUs are depicted in FIG. 1 as an example. However, the number of DUs is not intended to limit the scope of the present invention.

Besides, in the implementation structure illustrated in FIG. 2, the BS 1 may be split to three types of key devices—that is, the BS 1 may include one central unit (CU), e.g., the central unit 1C, one or more distributed units (DUs) connected to the CU, e.g., the DUs 1D1, 1D2, 1D3, 1D4, and one or more remote radio units (RRUs) connected to the DU, e.g., the RRUs 1R1, 1R2. Likewise, the connections between the DU and the RRUs may be fiber connections (but not limited thereto). It shall be noticed that as restricted by the paper size, FIG. 2 only depicts the RRUs 1R1, 1R2 connected to the DU 1D1 and the RRUs 1R3, 1R4 connected to the DU 1D41 as an example. However, in practice, there may be other RRUs connected to other DUs, and the number of RRUs is not intended to limit the scope of the present invention.

Figure 3:
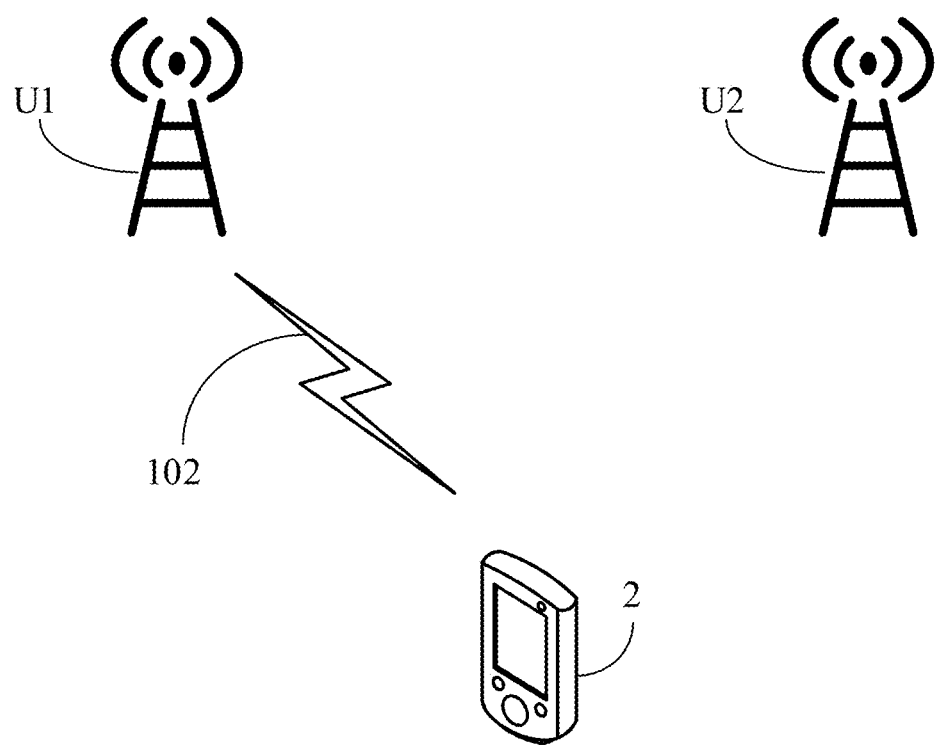
FIG. 3 depicts an implementation scenario in which the BS 1 transmits the downlink reception indication message 102 to the UE 2 according to the present invention.

FIG. 3 depicts an implementation scenario of signal transmission between the transmission reception points (TRPs) U1, U2 of the BS 1 and the UE 2 according to the present invention. The TRPs U1, U2 may be different DUs respectively, e.g., the DUs 1D1, 1D2 in FIG. 1, or may be different RRUs respectively, e.g., the RRU 1R1, 1R2 in FIG. 2. It shall be appreciated that, to simplify the description, only two TRPs U1, U2 are depicted in FIG. 3; however, the number of TRPs is not intended to limit the scope of the present invention, and the operations of the BS 1 with any number of TRPs shall be appreciated by those of ordinary skill in the art based on the following description and thus will be not further described herein.

The UE 2 may be a smart phone, a tablet computer or any mobile communication device conforming to the specification of the mobile communication system, e.g., a UE supporting an ultra-reliable low latency communication (URLLC) service, but not limited thereto. When the UE 2 and the BS 1 are connected in the normal state, the BS 1 communicates with the UE 2 through one of the TRPs (e.g., the TRP U1).

To achieve reliable transport block (TB) reception within a bounded latency, the BS 1 provides with multiple serving sources and uses the serving sources to perform the uplink and downlink transmissions. When BS 1 has a piece of downlink information and is going to transmit it to the UE 2 by multiplexing, the BS 1 generates a downlink reception indication message 102 and transmits the downlink reception indication message 102 to the UE 2 through the TRP U1 before performing the downlink multiplexing transmissions. The downlink reception indication message 102 includes a serving source configuration and a downlink parameter setting for signal combination. The serving source configuration indicates a plurality of serving sources to notify the UE 2 about what serving sources there are, the position of the downlink resource of each serving source and the corresponding demodulation reference signal (DMRS) ports. The downlink parameter setting for signal combination instructs the UE 2 how to receive the downlink signal by multiplexing—that is, how to combine the downlink signal from the different serving sources.

Afterwards, the BS 1 generates the first downlink signal DLS1 and the second downlink signal DLS2 based on the piece of downlink information. The first downlink signal DLS1 carries a first part of the piece of downlink information, and the second downlink signal DLS2 carries a second part of the piece of downlink information. For example, the downlink information may be a transport block (TB) or a piece of downlink control signal (DCI). When the downlink information is the TB, the first downlink signal DLS1 and the second downlink signal DLS2 are the downlink data signals transmitted on the physical downlink shared channel (PDSCH), and when the downlink information is the DCI, the first downlink signal DLS1 and the second downlink signal DLS2 are the downlink control signals transmitted on the physical downlink control channel (PDCCH).

Figure 4:
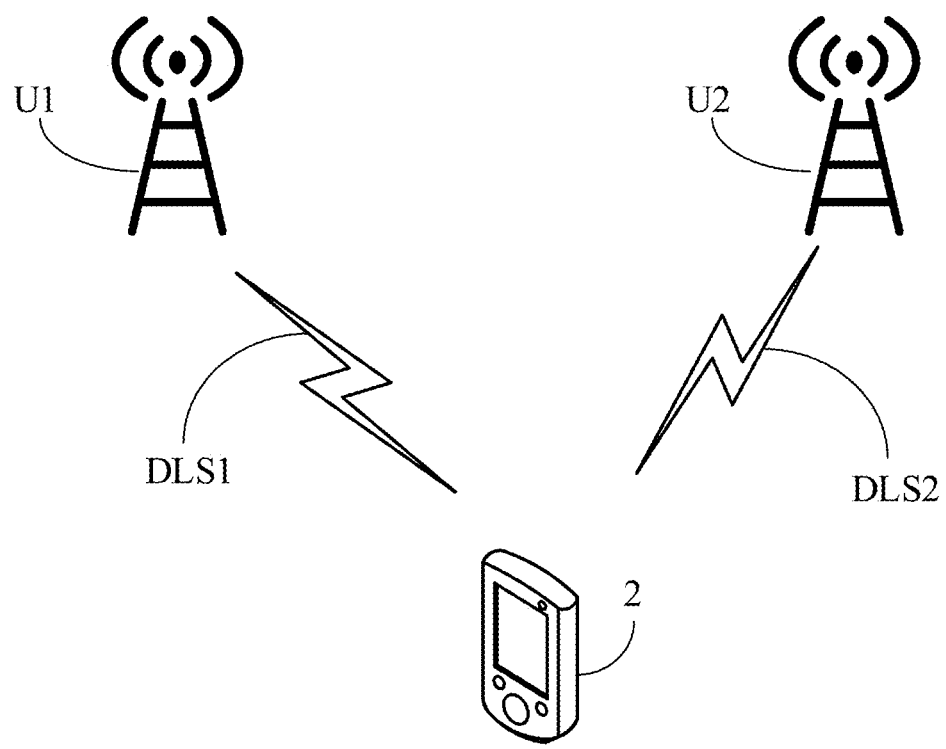
FIG. 4 depicts an implementation scenario in which the BS 1 transmits the downlink signals through different transmission reception points (TRPs) according to the present invention.

Next, the BS 1 transmits the first downlink signal DLS1 to the UE 2 through a first serving source of the serving sources, and transmits the second downlink signal DLS2 to the UE 2 through a second serving source of the serving sources. For example, as shown in FIG. 4, the serving sources of the present invention may be different TRPs (e.g., the TRPs U1, U2) such that the BS 1 can transmit the first downlink signal DLS1 to the UE 2 through the TRP U1, and transmit the second downlink signal DLS2 to the UE 2 through the TRP U2. In this case, the BS 1 can transmit the first downlink signal DLS1 and the second downlink signal DLS2 by using the different frequency resources respectively through the TRPs U1, U2. The downlink parameter setting for signal combination would indicate the frequency resource of the first downlink signal DLS1 and the frequency resource of the second downlink signal DLS2 for the UE 2 to receive the first downlink signal DLS1 and the second downlink signal DLS2 from the different frequency resources.

Moreover, since the TRP U1 and the TRP U2 have the different spatial locations, with the aid of the beamforming technique, the BS 1 may also make the TRP U1 and TRP U2 use the different beams to transmit the first downlink signal DLS1 and the second downlink signal DLS2 respectively so as to achieve the spatial multiplexing. In this case, the downlink parameter setting for signal combination would include the transmission configuration indication (TCI) state of the first downlink signal DLS1 and the TCI state of the second downlink signal DLS2 for the UE 2 to receive the first downlink signal DLS1 and the second downlink signal DLS2 from the different directions by using corresponding beams.

Besides, the TRP U1 and TRP U2 may use the same time-frequency resource or different time-frequency resources. To reduce the transmission latency, the TRP U1 and TRP U2 can use different time resources in a slot to transmit signals and the time interval for transmitting the first downlink signal DLS1 through TRP U1 and the time interval for transmitting the second downlink signal DLS2 through TRP U2 by the BS 1 are not overlapped to each other. In other words, the BS 1 provide the downlink time-division multiplexing (TDM) transmission in case of using the different spatial locations.

Figure 5:
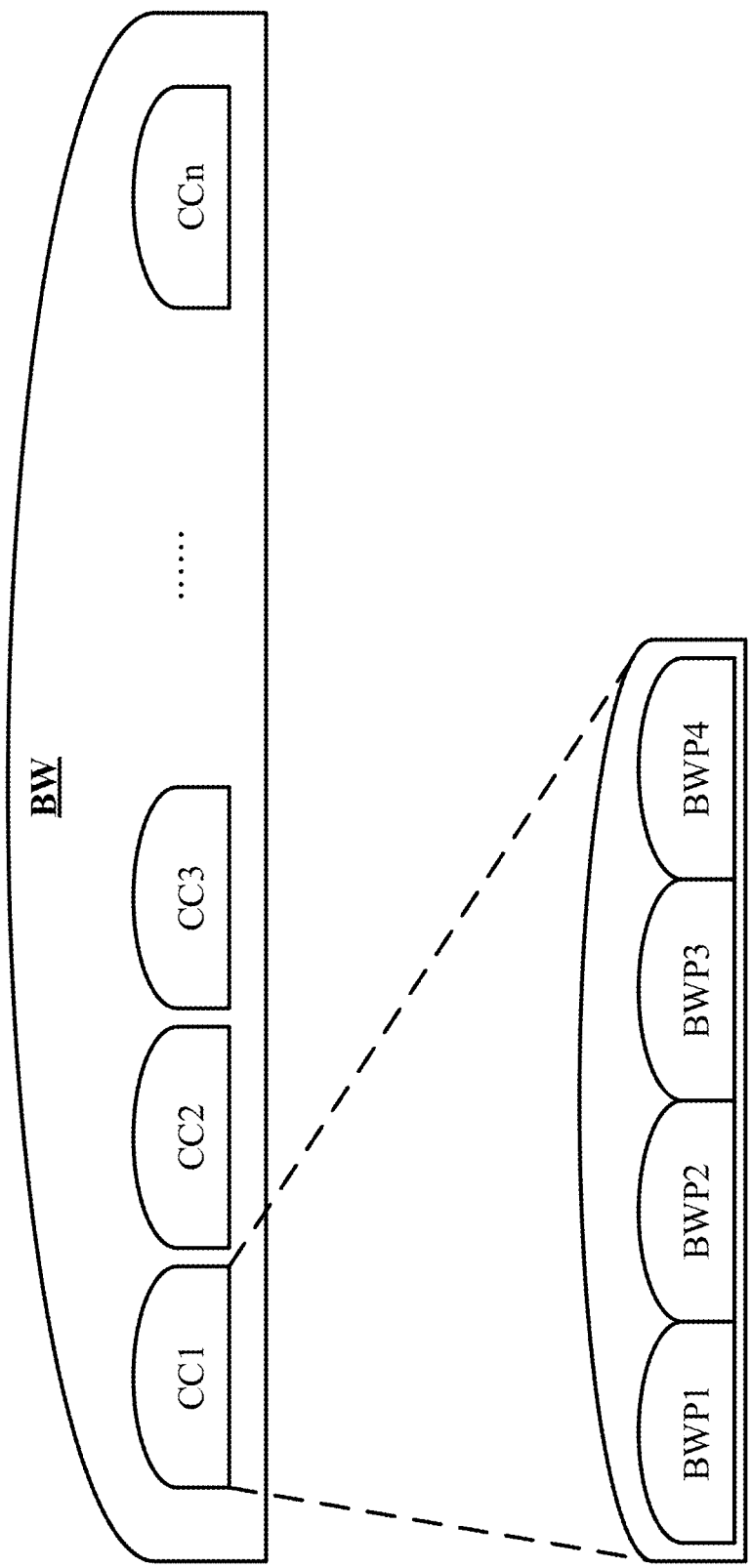
FIG. 5 depicts a configuration of the bandwidth parts (BWPs) in the 5G mobile communication system.

In addition, as shown in FIG. 5, the bandwidth BW of the 5G mobile communication system may be divided into a plurality of component carriers CC1-CCn, where n is a positive integer. Each component carrier may be further divided into multiple bandwidth parts, such as the bandwidth parts BWP1-BWP4. Thus, the serving sources of the present invention may be different bandwidth parts respectively and the BS 1 can transmit the first downlink signal DLS1 and the second downlink signal DLS2 through different bandwidth parts respectively.

Figure 6:
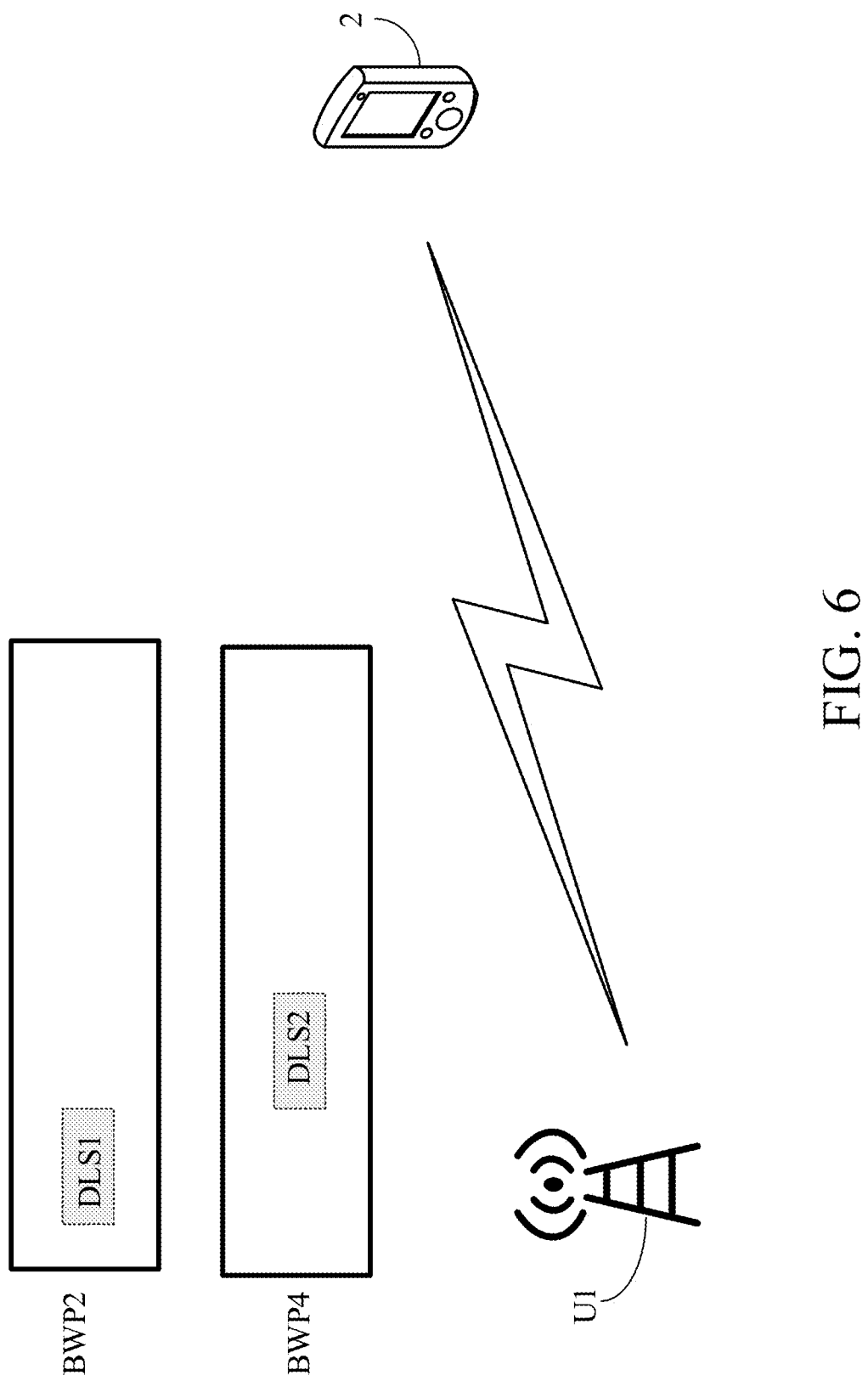
FIG. 6 depicts an implementation scenario in which the BS 1 transmits the downlink signals through different bandwidth parts according to the present invention.

For example, as shown in FIG. 6, the BS 1 transmits, via the TRP U1, the first downlink signal DLS1 to the UE 2 through the bandwidth part BWP2 and transmits, via the TRP U1, the second downlink signal DLS2 to UE 2 through the bandwidth part BWP4. To reduce the transmission latency, the radio resource in the bandwidth part BWP2 for transmitting the first downlink signal DLS1 and the radio resource in the bandwidth part BWP4 for transmitting the second downlink signal DLS2 may have an offset in the time domain such that the UE 2 can receive the first downlink signal DLS1 and the second downlink signal DLS2 by switching between different bandwidth parts.

As aforementioned, the downlink information may be a TB or a piece of DCI. When the downlink information is the TB, each of the first part and the second part corresponds to a redundancy version (RV). For example, the first downlink signal DLS1 and the second downlink signal DLS2 may carry different RVs, e.g., the first downlink signal DLS1 may carry the RV with No. 0 (i.e., the RV0) and the second downlink signal DLS2 may carry the RV with No. 1 (i.e., the RV1). In another example, the first downlink signal DLS1 and the second downlink signal DLS2 may carry the same RV, e.g., the first downlink signal DLS1 may carry the RV0 and the second downlink signal DLS2 may carry the RV0. Therefore, the present invention can have an additional coding gain by combining the RVs of the multiple serving sources.

Moreover, the first downlink signal DLS1 and the second downlink signal DLS2 may have the same modulation and coding scheme (MCS) or different MCSs. Since the first downlink signal DLS1 and the second downlink signal DLS2 may be transmitted simultaneously or successively, the downlink parameter setting for signal combination would indicate a first time interval of transmission of the first downlink signal DLS1 and a second time interval of transmission of the second downlink signal DLS2 for the UE 2 to receive them. The first time interval and the second time interval fall within a slot to meet the low latency requirement.

Besides, the BS 1 may also transmit the first downlink signal DLS1 and the second downlink signal DLS2 based on the hybrid automatic repeat-request (HARQ) mechanism. Further speaking, based on the HARQ mechanism, the BS 1 may transmit the first downlink signal DLS1 through the first serving source first. Next, according to the HARQ acknowledgment (HARQ-ACK) received from the UE 2, the BS 1 determines whether the first downlink signal DLS1 is successfully received (i.e., whether the downlink information can be decoded successfully from the first downlink signal DLS1). If the HARQ-ACK indicates the first downlink signal DLS1 is erroneously received (i.e., NACK), the BS 1 further transmits the second downlink signal DLS2 through the second serving source according to a channel quality information after receiving the HARQ-ACK. The channel quality information may be obtained from the measurement by BS 1 itself, the measurement result report received from the UE 2, or the previous signal receiving result of the UE 2.

In addition, when the downlink information is the TB, alternatively, each of the first part and the second part may correspond to a code block group (CBG). For example, the first downlink signal DLS1 may carry the CBG with No. 0 (e.g., the CBG0) and the second downlink signal DLS2 may carry the CBG with No. 1 (e.g., the CBG1), so each CBG can be decoded individually. In this case, the first downlink signal DLS1 and the second downlink signal DLS2 may be transmitted simultaneously or successively. Besides, if the BS 1 receives the HARQ-ACK, which indicates that the first downlink signal DLS1 is erroneously received, from the UE 2 based on the HARQ mechanism, the BS 1 further re-transmits the first downlink signal DLS1 through the second serving source or another serving source of the serving sources according to the channel quality information. In other words, the BS 1 can select the other serving source with better channel quality to re-transmits the first downlink signal DLS1 based on channel quality information.

On the other hand, when the downlink information is the piece of DCI, the first downlink signal DLS1 is a first downlink control signal and the second downlink signal DLS2 is a second downlink control signal. In this case, the UE 2 can combine the first downlink control signal and the second downlink control signal to obtain the piece of DCI according to the downlink parameter setting for signal combination.

Figure 7:
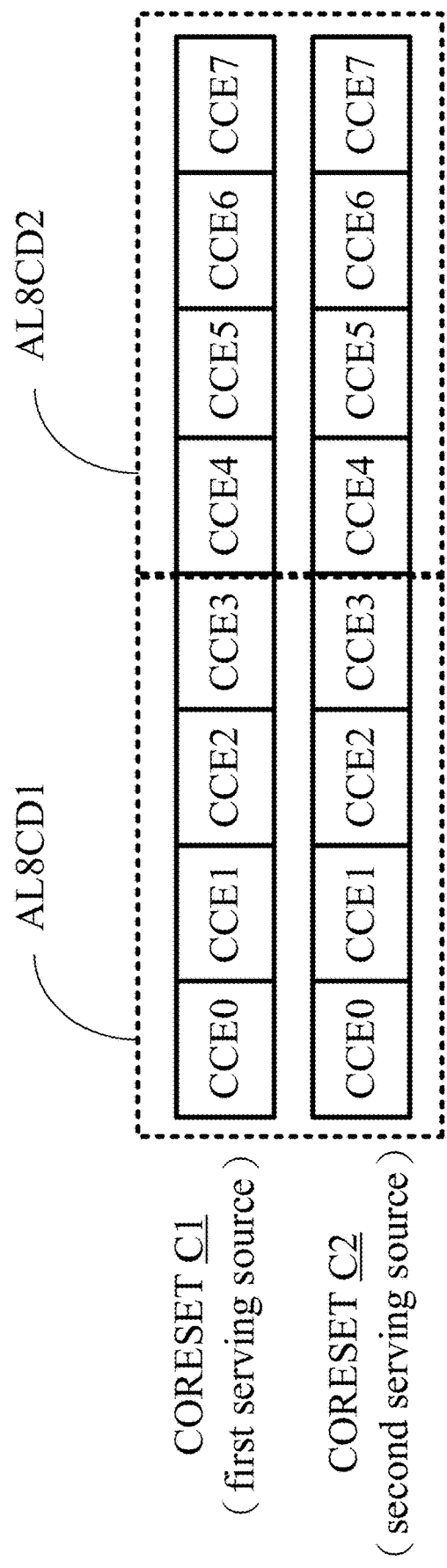
FIG. 7 depicts an implementation scenario in which the BS 1 transmits the first downlink control signal by using the control channel elements (CCEs) in the first control resource set (CORESET) C1 and transmits the second downlink control signal by using the CCEs in the second CORESET C2 according to the present invention.

For example, as shown in FIG. 7, the BS 1 may modulate and encode a piece of DCI to generate two pieces of encoded control information (i.e., the first and second parts), where the first and second parts may have the same coding parameter or different coding parameters. Afterwards, the BS 1 transmits the first downlink control signal on the control channel elements (CCEs) CCE0-CCE3 in the first control resource set (CORESET) C1 to carry the first part and transmits the second downlink control signal on the CCEs CCE0-CCE3 in the second CORESET C2 to carry the second part. When the serving source are different TRPs, the CCEs in the CORESET C1 and the CCEs in the CORESET C2 may be configured to have the same time-frequency resource, partial overlapped time-frequency resources, or different time-frequency resources.

Accordingly, the BS 1 transmits the piece of DCI as using the configuration with the aggregation level corresponding to 8 CCEs—that is, the CCEs CCE0-CCE3 in the first CORESET C1 and the CCEs CCE0-CCE3 in the second CORESET C2 are equivalent to a candidate AL8CD1 with the aggregation level corresponding to 8 CCEs and the CCEs CCE4-CCE7 in the first CORESET C1 and the CCEs CCE4-CCE7 in the second CORESET C2 are equivalent to a candidate AL8CD2 with the aggregation level corresponding to 8 CCEs. Compared to the prior art which only transmits a single piece of DCI on the CCEs of a single CORESET, the present invention transmits the piece of DCI by multiplexing it on the CCEs in the CORESETs of the different serving sources, so the present invention can provide an additional diversity gain and increase reliability.

Figure 8:
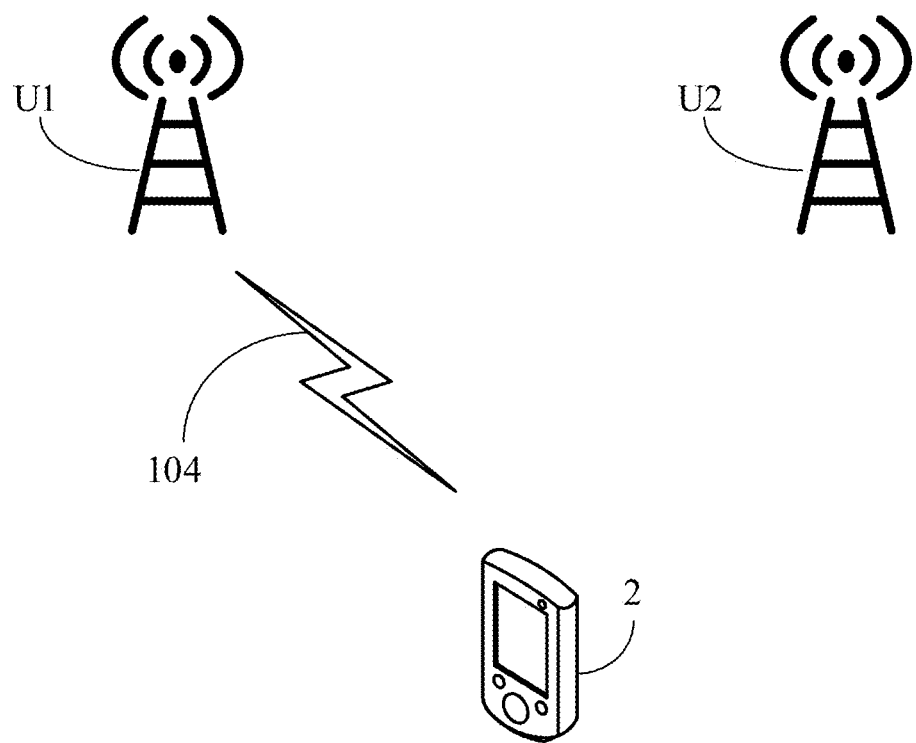
FIG. 8 depicts an implementation scenario in which the BS 1 transmits the uplink transmission indication message 104 to the UE 2 according to the present invention.

A second embodiment of the present invention is as shown in FIG. 8. In the uplink transmission, the UE 2 may select one serving source from the serving sources to transmit the uplink signal so as to reduce latency. Further speaking, the BS 1 generates an uplink transmission indication message 104 including a serving source configuration and an uplink transmission parameter setting. Similarly, the serving source configuration indicates a plurality of serving sources to notify the UE 2 about what serving sources there are and the position of the uplink resource of each serving source. The uplink transmission parameter setting instructs the UE 2 how to perform the uplink multiplexing transmission through these serving sources.

The UE 2 receives the uplink transmission indication message 104 from the BS 1. Afterwards, when the UE 2 has an uplink information being about to be transmitted, the UE 2 generates a first uplink signal ULS1 to carry the uplink information. Next, the UE 2 selects a first serving source from the serving source, and transmits the first uplink signal ULS1 to the BS 1 through the first serving source. Thus, the BS 1 can receive the first uplink signal ULS1 through the first serving source of the serving sources.

As aforementioned, in the present invention, the serving sources may be different TRPs respectively (e.g., the TRP U1 and TRP U2), or the serving sources may be different BWPs respectively (herein referring to the uplink BWPs). Thus, the UE 2 can select one of the serving sources and transmit the first uplink signal ULS1 through the selected serving source.

Figure 9:
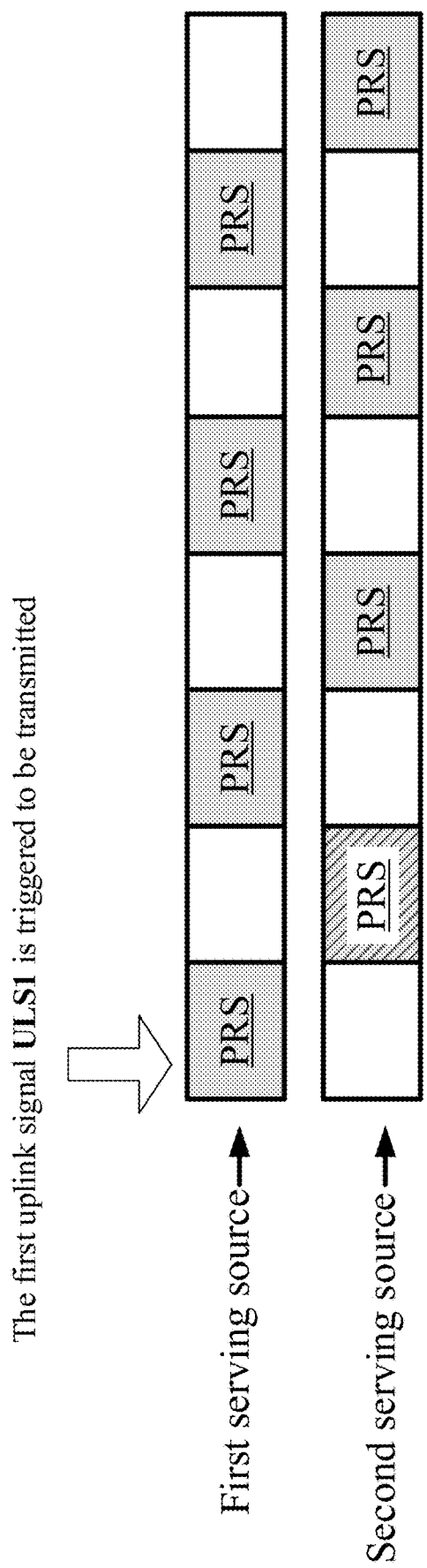
FIG. 9 depicts that the UE 2 selects the serving source in response to the time point at which the first uplink signal ULS1 is triggered to be transmit according to the present invention.
Figure 10:
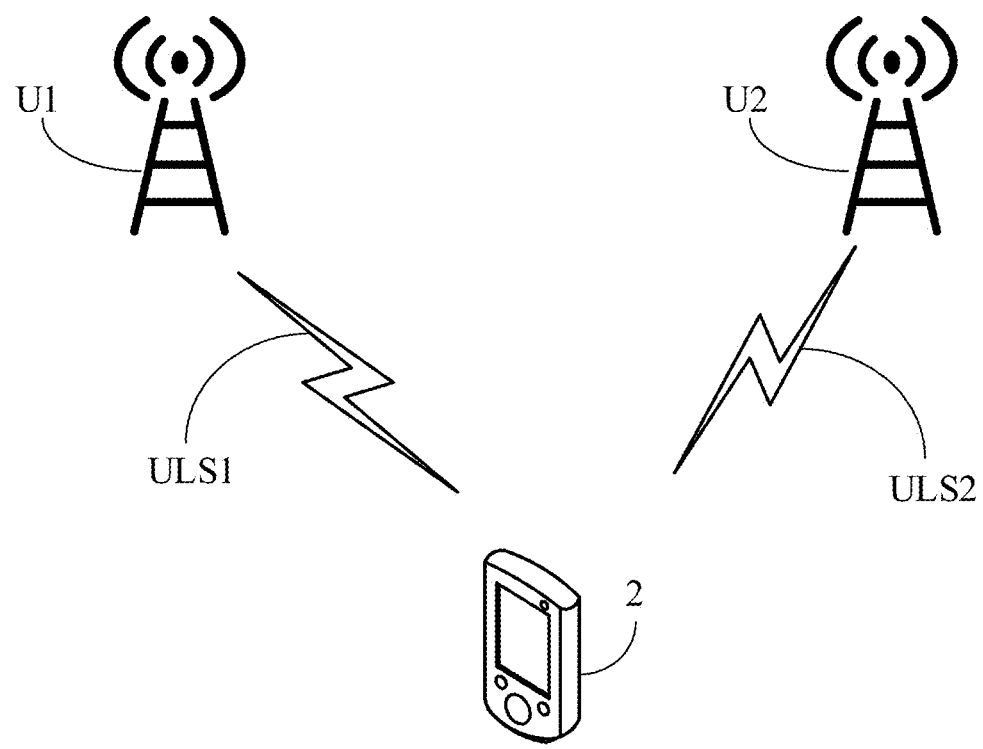
FIG. 10 depicts an implementation scenario in which the UE 2 transmits the uplink signals through different TRPs according to the present invention.

For example, the serving source configuration may indicate a periodic radio resource of each serving source, and the periodic radio resources of the serving sources are configured to have an offset in the time domain to each other and have different starting positions. As shown in FIG. 9, the periodic radio resources PRS of the first and second serving sources are interleaved to each other so they have an offset and different starting positions in the time domain. Therefore, in response to the time point at which the first uplink signal ULS1 is triggered to be transmitted, the UE 2 can select one of the serving sources, which is able to be used for transmitting the first uplink signal ULS1 at the earliest, and transmit the first uplink signal ULS1 on its periodic radio resource PRS (e.g., the periodic radio resource PRS of the second serving source represented by the hatched region).

In an implementation scenario, the periodic radio resources PRS may be the configured radio resources on the physical uplink control channel (PUCCH) for transmitting the uplink control signal (UCI), e.g., the radio resource for transmitting the scheduling request (SR). Besides, in another implementation scenario, the periodic radio resources PRS may be the configured uplink grant-free radio resources on the physical uplink shared channel (PUSCH) for transmitting the uplink data.

A third embodiment of the present invention is as shown in FIGS. 8-9. In the uplink transmission, the UE 2 may also select at least two serving sources from the serving sources to transmit at least two uplink signals so as to achieve the multiplexing transmissions. As aforementioned, the BS 1 generates the uplink transmission indication message 104 including the serving source configuration and the uplink transmission parameter setting. The serving source configuration indicates a plurality of serving sources to notify the UE 2 about what serving sources there are and the position of the downlink resource of each serving source. The uplink transmission parameter setting instructs the UE 2 how to perform the uplink multiplexing transmission through these serving sources.

When BS 1 allows the UE 2 to transmit the uplink signal by multiplexing, the UE 2 can generate the first uplink signal ULS1 and the second uplink signal ULS2 based on a piece of uplink information. Afterwards, the UE 2 selects a first serving source and a second serving source from the serving sources, and transmits the first uplink signal ULS1 through the first serving source and the second uplink signal ULS2 through the second serving source separately. The first uplink signal ULS1 carries a first part of the piece of uplink information, and the second uplink signal ULS2 carries a second part of the piece of uplink information.

In detail, the uplink information may be a transport block (TB) or a piece of uplink control signal (UCI). When the uplink information is the TB, the first uplink signal ULS1 and the second uplink signal ULS2 are the uplink data signals transmitted on the physical uplink shared channel (PUSCH), and when the uplink information is the UCI, the first uplink signal ULS1 and the second uplink signal ULS2 are the uplink control signals transmitted on the physical uplink control channel (PUCCH).

For example, as shown in FIG. 8, the serving sources of the present invention may be different TRPs (e.g., the TRPs U1, U2) such that the UE 2 can transmit the first uplink signal ULS1 to the BS 1 through the TRP U1 and transmit the second uplink signal ULS2 to the BS 1 through the TRP U2. In this case, the UE 2 can transmit the first uplink signal ULS1 and the second uplink signal ULS2 by using the same time-frequency resource or different time-frequency resources through the TRPs U1, U2 respectively.

Besides, the UE 2 may use different time resources in a slot to transmit the first uplink signal ULS1 and the second uplink signal ULS2 to the TRP U1 and the TRP U2 respectively. When the UE 2 uses the different time resources, the time interval for transmitting the first uplink signal ULS1 to the TRP U1 and the time interval for transmitting the second uplink signal ULS2 to the TRP U2 are not overlapped to each other. In other words, the BS 1 provide the uplink time-division multiplexing (TDM) transmission in case of using the different spatial locations.

Moreover, since the TRP U1 and the TRP U2 have the different spatial locations, with the aid of the beamforming technique, the UE 2 may use different beams to transmit the first uplink signal ULS1 and the second uplink signal ULS2 respectively so as to achieve the spatial multiplexing. In this case, the radio resources for the first uplink signal ULS1 and the second uplink signal ULS2 may be the same time-frequency resource, and the TRP U1 and the TRP U2 of BS 1 would receive the first uplink signal ULS1 and the second uplink signal ULS2 from the different directions by using corresponding beams accordingly.

Figure 11:
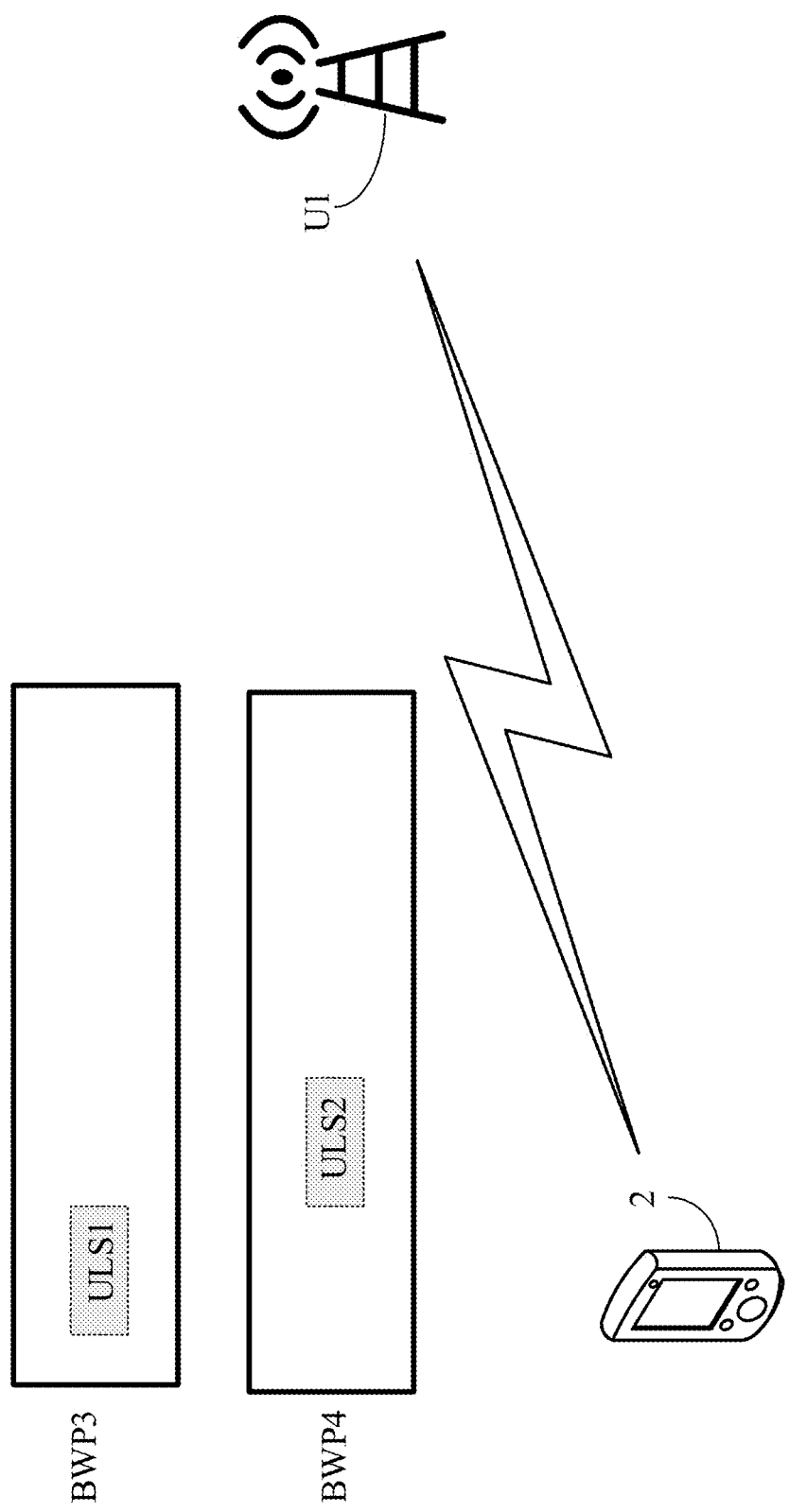
FIG. 11 depicts an implementation scenario in which the UE 2 transmits the uplink signals through different bandwidth parts according to the present invention.

Similarly, the serving sources of the present invention may be different bandwidth parts respectively and the UE 2 can transmit the first uplink signal ULS1 and the second downlink signal ULS2 through different bandwidth parts respectively. For example, as shown in FIG. 11, the UE 2 transmits the first uplink signal ULS1 to the TRP U1 of the BS 1 through the bandwidth part BWP3 and transmits the second uplink signal ULS2 to the TRP U1 of the BS 1 through the bandwidth part BWP4. If the UE 2 is unable to transmit the uplink signals in different bandwidth parts at the same time, in order to reduce the transmission latency, the radio resource in the bandwidth part BWP3 for transmitting the first uplink signal ULS1 and the radio resource in the bandwidth part BWP4 for transmitting the second uplink signal DLS2 may have an offset in the time domain such that the UE 2 can transmit the first uplink signal ULS1 and the second uplink signal ULS2 by switching between different bandwidth parts.

As aforementioned, the uplink information may be a TB or a piece of UCI. When the uplink information is the TB, the first part and the second part may correspond to the same redundancy version (RV) or different RVs. For example, the first uplink signal ULS1 and the second uplink signal ULS2 may carry different RVs, e.g., the first uplink signal ULS1 may carry the RV with No. 0 (i.e., the RV0) and the second uplink signal ULS2 may carry the RV with No. 1 (i.e., the RV1). In another example, the first uplink signal ULS1 and the second uplink signal ULS2 may carry the same RV, e.g., the first uplink signal ULS1 may carry the RV0 and the second uplink signal ULS2 may carry the RV0. Therefore, the present invention can have an additional coding gain by combining the RVs of the multiple serving sources.

Moreover, the first uplink signal ULS1 and the second uplink signal ULS2 may be transmitted simultaneously or successively, the uplink transmission parameter setting would indicate a first time interval of transmission of the first uplink signal ULS1 and a second time interval of transmission of the second uplink signal ULS2. The first time interval and the second time interval fall within a slot to meet the low latency requirement. In other words, for different serving sources, the BS 1 may configure the radio resources with the same starting position or different starting positions in the time domain for the UE 2 to transmit the first uplink signal ULS1 and the second uplink signal ULS2 respectively.

Besides, the UE 2 may also transmit the first uplink signal ULS1 and the second uplink signal ULS2 based on the hybrid automatic repeat-request (HARQ) mechanism. Further speaking, based on the HARQ mechanism, the UE 2 can transmit the first uplink signal ULS1 through the first serving source first. Next, according to the HARQ acknowledgment (HARQ-ACK) received from the BS 1, the UE 2 determine whether the first uplink signal ULS1 is successfully received. If the HARQ-ACK indicates that the first uplink signal ULS1 is erroneously received, the UE 2 further transmits the second uplink signal ULS2 through the second serving source according to a channel quality information after receiving the HARQ-ACK. The channel quality information may be generated by the BS 1 according to the measurement by BS 1 itself, the measurement result report received from the UE 2, or the previous signal receiving result of the BS 1, and the UE 2 will be notified of it from the BS 1.

In addition, when the uplink information is the TB, alternatively, each of the first part and the second part may corresponds to a code block group (CBG). For example, the first uplink signal ULS1 may carry the CBG with No. 0 (e.g., the CBG0) and the second uplink signal ULS2 may carry the CBG with No. 1 (e.g., the CBG1) so as to have an additional coding gain bring from channel coding. In this case, the first uplink signal ULS1 and the second downlink signal ULS2 may be transmitted simultaneously or successively. Besides, if the UE 2 receives the HARQ-ACK, which indicates that the first uplink signal ULS1 is erroneously received, from the BS 1 based on the HARQ mechanism, the UE 2 further re-transmits the first uplink signal ULS1 through the second serving source or another serving source of the serving sources according to the channel quality information. In other words, the UE 2 can use the other serving source with better channel quality to re-transmits the first uplink signal ULS1 based on channel quality information.

On the other hand, when the uplink information is the piece of UCI, the first uplink signal ULS1 is a first uplink control signal and the second uplink signal ULS2 is a second uplink control signal. In this case, the BS 1 can combine the first uplink control signal and the second uplink control signal to obtain the piece of UCI according to the uplink transmission parameter setting.

For example, the UE 2 may modulate and encode a piece of UCI to generate two pieces of encoded control information (i.e., the first and second parts), where the first and second parts may have the same coding parameter or different coding parameters. Afterwards, the UE 2 transmits the first uplink control signal on the PUCCH resource of the first serving source to carry the first part and transmits the second uplink control signal on the PUCCH resource of the second serving source to carry the second part. The PUCCH resource of the first serving source and the PUCCH resource of the second serving source may be configured to have same symbol length or different symbol lengths. In addition, when the serving source are different TRPs, the PUCCH resource of the first serving source and the PUCCH resource of the second serving source may be configured to have the same time-frequency resource or different time-frequency resources.

Accordingly, the BS 1 can combine the first uplink signal ULS1 and the second uplink signal ULS2 to obtain the UCI.

Compared to the prior art which only transmits a single piece of UCI on a single PUCCH, the present invention transmits the piece of UCI by multiplexing it on the PUCCH resources of the different serving sources, so the present invention can provide an additional diversity gain and increase reliability.

Figure 12:
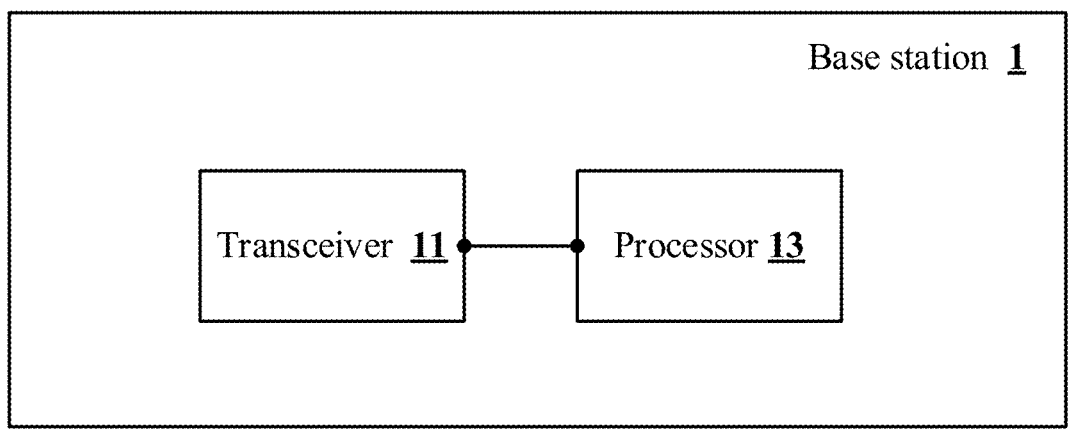
FIG. 12 is a schematic view of the BS 1 according to the present invention.

A fourth embodiment of the present invention is as shown in FIG. 12, which is a schematic view of the BS 1 according to the present invention. The BS 1 comprises a transceiver 11 and a processor 13. The processor 13 is electrically connected to the transceiver 11. It shall be appreciated that, for simplifying the description, other components of the BS 1 such as the storage, the housing, the power supply module and other components irrelevant to the present invention are omitted from depiction in the drawings.

The processor 13 includes the processors installed in the CU and each DU. The transceiver 11 includes the transceivers installed in each DU, which the radio unit has been integrated into, or the transceivers installed in each RRU—that is, the transceiver 11 includes the transceivers of each TRP. The processor 13 may be any of various processors, central processing units (CPUs), microprocessors, digital signal processors, other computing devices known to those of ordinary skill in the art, or any combination thereof. Based on the previous embodiments, those of ordinary skill in the art would appreciated that, "transmitting and receiving signal via the transceiver 11" means transmitting and receiving signal by the corresponding TRP with respect to each of various implementation scenarios, and "signals, messages or information are processed by the processor 13" means that signals, messages or information are processed by the corresponding processor of the CU or DU with respect to each of various implementation scenarios.

First, referring to the first embodiment, when there is a piece of downlink information is going to be transmitted to the UE 2, the processor 13 generates a downlink reception indication message 102 including a serving source configuration and a downlink parameter setting for signal combination. The serving source configuration indicates a plurality of serving sources. The processor 13 transmits the downlink reception indication message 102 to the UE 2 via the transceiver 11. Afterwards, the processor 13 generates the first downlink signal DLS1 and the second downlink signal DLS2 based on the piece of downlink information. The first downlink signal DLS1 carries a first part of the piece of downlink information and the second downlink signal DLS2 carries a second part of the piece of downlink information. Next, the processor 13 transmits the first downlink signal DLS1 to the UE 2 through a first serving source of the serving sources via the transceiver 11, and transmits the second downlink signal DLS2 to the UE 2 through a second serving source of the serving sources via the transceiver 11.

In an embodiment, the piece of downlink information is a transport block. Each of the first part and the second part corresponds to a redundancy version (RV). The first part and the second part may correspond to the same RV or different RVs.

In an embodiment, the processor 13 further receives, from the UE 2 via the transceiver 11, a hybrid automatic repeat-request acknowledgment (HARQ-ACK) indicating that the first downlink signal DLS1 is erroneously received. The processor 13 further transmits the second downlink signal DLS2 through the second serving source via the transceiver 11 according to a channel quality information after receiving the HARQ-ACK.

In an embodiment, the downlink parameter setting for signal combination further indicates a first time interval of transmission of the first downlink signal DLS1 and a second time interval of transmission of the second downlink signal DLS2. The first time interval and the second time interval fall within a slot.

In an embodiment, the downlink parameter setting for signal combination further includes a first transmission configuration indication (TCI) state of transmission of the first downlink signal DLS1, and a second TCI state of transmission of the second downlink signal DLS2.

In an embodiment, the piece of downlink information is a transport block. Each of the first part and the second part corresponds to a code block group (CBG). The first downlink signal DLS1 and the second downlink signal DLS2 may be transmitted simultaneously or successively.

In an embodiment, the processor 13 further receives, from the UE 2 via the transceiver 11, an HARQ-ACK indicating that the first downlink signal DLS1 is erroneously received. The processor 13 further transmits the first downlink signal DLS1 through the second serving source or another serving source of the serving sources via the transceiver 11 according to a channel quality information after receiving the HARQ-ACK.

In an embodiment, the transceiver 11 is installed in a plurality of transmission reception points (TRPs), and the serving sources are the TRPs.

In an embodiment, the serving sources are different bandwidth parts.

In an embodiment, the piece of downlink information is a piece of downlink control information (DCI), and the first downlink signal DLS1 is a first downlink control signal and the second downlink signal DLS2 is a second downlink control signal so that the UE 2 combines the first downlink control signal and the second downlink control signal to obtain the downlink control information according to the downlink parameter setting for signal combination.

Please also refer to FIG. 12 for the fifth embodiment of the present invention. Different from the fourth embodiment which corresponds to the first embodiment, this embodiment corresponds to the second embodiment. First, the processor 13 generates an uplink transmission indication message 104 including a serving source configuration and an uplink transmission parameter setting. The serving source configuration indicates a plurality of serving sources. Next, the processor 13 transmits the uplink transmission indication message 104 to the UE 2 via the transceiver 11. Afterwards, the processor 13 receives a first uplink signal ULS1 from the UE 2 through a first serving source of the serving sources via the transceiver 11.

In an embodiment, the serving source configuration further indicates a periodic radio resource of each of the serving sources. The processor 13 configures the periodic radio resources of the serving sources to make the periodic radio resources have an offset in the time domain to each other and have different starting positions.

In an embodiment corresponding to the third embodiment, the processor 13 further receives a second uplink signal DLS2 from the UE 2 through a second serving source of the serving sources via the transceiver 11. In an embodiment, the first uplink signal ULS1 and the second uplink signal ULS2 are generated by the UE 2 based on a piece of uplink information. The first uplink signal ULS1 carries a first part of the piece of uplink information and the second uplink signal ULS2 carries a second part of the piece of uplink information.

In an embodiment corresponding to the third embodiment, the uplink information is an uplink control information (UCI), the first uplink signal ULS1 is a first uplink control signal, and the second uplink signal ULS2 is a second uplink control signal. The first uplink control signal and the second uplink control signal are associated—that is, the UE 2 may modulate and encode a piece of UCI to generate two pieces of encoded control information (i.e., the first and second parts), where the first and second parts may have the same coding parameter or different coding parameters. The processor 13 further combines the first uplink control signal and the second uplink control signal to obtain the UCI according to the uplink transmission parameter setting.

Figure 13:
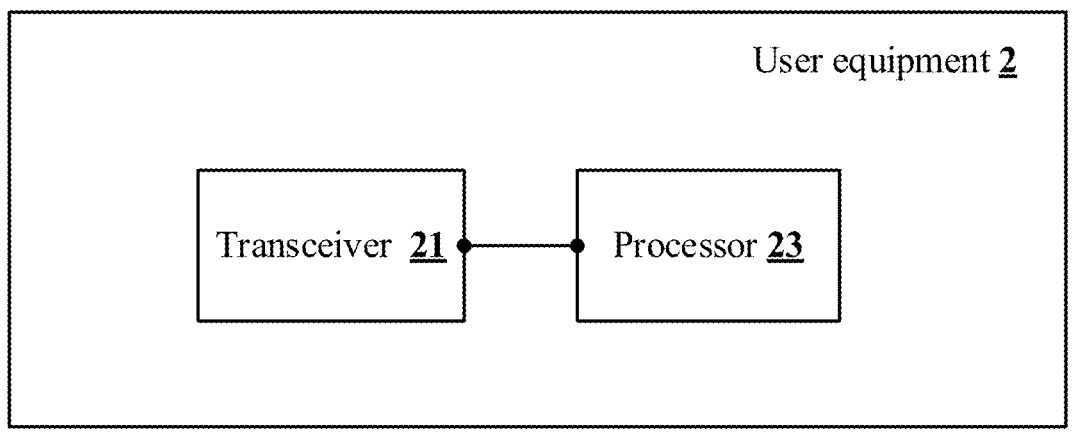
FIG. 13 is a schematic view of the UE 2 according to the present invention.

A sixth embodiment of the present invention is as shown in FIG. 13, which is a schematic view of the UE 2 according to the present invention. The UE 2 comprises a transceiver 21 and a processor 23. The processor 23 is electrically connected to the transceiver 21. Likewise, for simplifying the description, other components of the UE 2 such as the storage, the housing, the power supply module and other components irrelevant to the present invention are omitted from depiction in the drawings. The processor 23 may be any of various processors, Central Processing Units (CPUs), microprocessors, digital signal processors, or other computing devices known to those of ordinary skill in the art.

First, referring to the second embodiment, the processor 23 receives an uplink transmission indication message 104 from a BS 1. The uplink transmission indication message 104 includes a serving source configuration and an uplink transmission parameter setting. The serving source configuration indicating a plurality of serving sources. The processor 23 selects a first serving source from the serving sources, and transmits a first uplink signal ULS1 to the BS 1 through the first serving source via the transceiver 21.

In an embodiment, the serving source configuration further indicates a periodic radio resource of each of the serving sources. The periodic radio resources of the serving sources are configured to have an offset in the time domain to each other and have different starting positions. The processor 23 selects the first serving source from the serving sources according to the starting positions of the serving sources.

In an embodiment corresponding to the third embodiment, the processor 23 further generates the first uplink signal ULS1 and a second uplink signal ULS2 based on a piece of uplink information. The processor 23 selects a second serving source from the serving sources, and transmits the second uplink signal ULS2 through the second serving source via the transceiver 21. The first uplink signal ULS1 carries a first part of the piece of uplink information and the second uplink signal ULS2 carries a second part of the piece of uplink information. In other words, the processor 23 transmits, via the transceiver 21, the first uplink signal ULS1 and the second uplink signal ULS2 through the first serving source and the second serving source respectively.

In an embodiment corresponding to the third embodiment, the piece of uplink information is a transport block. Each of the first part and the second part corresponds to a redundancy version (RV). The first part and the second part may correspond to the same RV or different RVs.

In an embodiment corresponding to the third embodiment, the processor 23 further receives, from the BS 1 via the transceiver 21, an HARQ-ACK indicating that the first uplink signal ULS1 is erroneously received. The processor 23 further transmits the second uplink signal ULS2 through the second serving source via the transceiver 21 according to a channel quality information after receiving the HARQ-ACK.

In an embodiment corresponding to the third embodiment, the uplink transmission parameter setting further indicates a first time interval of transmission of the first uplink signal ULS1 and a second time interval of transmission of the second uplink signal ULS2. The first time interval and the second time interval fall within a slot.

In an embodiment corresponding to the third embodiment, the uplink information is a transport block. Each of the first part and the second part corresponds to a code block group (CBG). The first uplink signal ULS1 and the second uplink signal ULS2 may be transmitted simultaneously or successively.

In an embodiment corresponding to the third embodiment, the processor 23 further receives, from the BS 1 via the transceiver 21, an HARQ-ACK indicating that the first uplink signal ULS1 is erroneously received. The processor 23 further transmits the first uplink signal ULS1 through the second serving source or another serving source of the serving sources via the transceiver 21 according to a channel quality information after receiving the HARQ-ACK.

In an embodiment corresponding to the third embodiment, the BS 1 have a plurality of transmission reception points (TRPs), and the serving source are the TRPs respectively. The first serving source is a first TRP U1 of the TRPs, and the second serving source is a second TRP U2 of the TRPs. The transceiver 21 uses a first beam to transmit the first uplink signal ULS1 to the first TRP U1 and uses a second beam to transmit the second uplink signal ULS2 to the second TRP U2.

In an embodiment corresponding to the third embodiment, the serving sources are different bandwidth parts.

According to the above descriptions, the BS of the present invention provides multiple serving sources to perform uplink and downlink multiplexing transmission of a TB through the serving sources so that the UE could achieve reliable TB transmission/reception within a bounded latency to meet the requirements for the URLLC service or other services with low latency. Moreover, in the transmission mechanism of the present invention, the UE can select at least one of the serving sources to transmit uplink signals to the BS to increase uplink transmission reliability and reduce uplink transmission latency. Besides, the present invention transmits the piece of DCI by multiplexing it on the CCEs in the CORESETs of the different serving sources and transmits the piece of UCI by multiplexing it on the PUCCH resources of the different serving sources, so the present invention can provide an additional diversity gain and increase reliability.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station (BS) for a mobile communication system, comprising:
   a transceiver; and
   a processor electrically connected to the transceiver, being configured to execute the following operations:
      generating a first downlink reception indication message including a first serving source configuration and a first downlink parameter setting for signal combination, the first serving source configuration indicating a plurality of serving sources;

transmitting the first downlink reception indication message to a first user equipment (UE) via the transceiver;

generating a first downlink signal and a second downlink signal based on a first piece of downlink information, wherein the first downlink signal carries a first part of the first piece of downlink information and the second downlink signal carries a second part of the first piece of downlink information;

transmitting the first downlink signal to the first UE through a first serving source of the serving sources indicated by the first serving source configuration via the transceiver; and transmitting the second downlink signal to the first UE through a second serving source of the serving sources indicated by the first serving source configuration via the transceivers;

wherein the first piece of downlink information is a piece of downlink control information (DCI), and the first downlink signal is a first downlink control signal and the second downlink signal is a second downlink control signal so that the first UE combines the first downlink control signal and the second downlink control signal to obtain the piece of downlink control information according to the first downlink parameter setting for signal combination.

2. The base station of claim 1, wherein the processor further executes the following operations:

generating a second downlink reception indication message including a second serving source configuration and a second downlink parameter setting for signal combination, the second serving source configuration indicating a plurality of serving sources;

transmitting the second downlink reception indication message to a second UE via the transceiver;

generating a third downlink signal and a fourth downlink signal based on a second piece of downlink information, wherein the third downlink signal carries a third part of the second piece of downlink information and the fourth downlink signal carries a fourth part of the second piece of downlink information;

transmitting the third downlink signal to the second UE through a third serving source of the serving sources indicated by the second serving source configuration via the transceiver; and transmitting the fourth downlink signal to the second UE through a fourth serving source of the serving sources indicated by the second serving source configuration via the transceiver;

wherein the second piece of downlink information is a transport block, and each of the third part and the fourth part corresponds to a redundancy version (RV).

3. The base station of claim 2, wherein the processor further receives, from the second UE via the transceiver, a hybrid automatic repeat-request acknowledgment (HARQ-ACK) indicating that the third downlink signal is erroneously received, and the processor further transmits the fourth downlink signal through the fourth serving source via the transceiver according to a channel quality information after receiving the HARQ-ACK.

4. The base station of claim 2, wherein the second downlink parameter setting for signal combination further indicates a first time interval of transmission of the third downlink signal and a second time interval of transmission of the fourth downlink signal, and the first time interval and the second time interval fall within a slot.

5. The base station of claim 2, wherein the second downlink parameter setting for signal combination further includes a first transmission configuration indication (TCI) state of transmission of the third downlink signal and a second TCI state of transmission of the fourth downlink signal.

6. The base station of claim 1, wherein the processor further executes the following operations:

generating a second downlink reception indication message including a second serving source configuration and a second downlink parameter setting for signal combination, the second serving source configuration indicating a plurality of serving sources;

transmitting the second downlink reception indication message to a second UE via the transceiver;

generating a third downlink signal and a fourth downlink signal based on a second piece of downlink information, wherein the third downlink signal carries a third part of the second piece of downlink information and the fourth downlink signal carries a fourth part of the second piece of downlink information;

transmitting the third downlink signal to the second UE through a third serving source of the serving sources indicated by the second serving source configuration via the transceiver; and transmitting the fourth downlink signal to the second UE through a fourth serving source of the serving sources indicated by the second serving source configuration via the transceiver;

wherein the second piece of downlink information is a transport block, and each of the third part and the fourth part corresponds to a code block group (CBG).

7. The base station of claim 6, wherein the processor further receives, from the second UE via the transceiver, an HARQ-ACK indicating that the third downlink signal is erroneously received, and the processor further transmits the third downlink signal through the fourth serving source or another serving source indicated by the second serving source configuration via the transceiver according to a channel quality information after receiving the HARQ-ACK.

8. The base station of claim 1, wherein the transceiver is installed in a plurality of transmission reception points (TRPs), and the serving sources indicated by the first serving source configuration are the TRPs.

9. The base station of claim 1, wherein the serving sources indicated by the first serving source configuration are different bandwidth parts.

* * * * *